US012651710B2

(12) United States Patent
Kurahashi

(10) Patent No.: US 12,651,710 B2
(45) Date of Patent: Jun. 9, 2026

(54) ELECTRODE FOIL FOR HIGH-PERFORMANCE ELECTROLYTIC CAPACITORS WITH HIGH RELIABILITY

(71) Applicant: Panasonic Intellectual Property Management Co., Ltd., Kadoma (JP)

(72) Inventor: Hideyuki Kurahashi, Tokyo To (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 18/691,297

(22) PCT Filed: Sep. 2, 2022

(86) PCT No.: PCT/JP2022/033070
§ 371 (c)(1),
(2) Date: Mar. 12, 2024

(87) PCT Pub. No.: WO2023/042681
PCT Pub. Date: Mar. 23, 2023

(65) Prior Publication Data
US 2024/0379295 A1 Nov. 14, 2024

(30) Foreign Application Priority Data
Sep. 15, 2021 (JP) ................................. 2021-150429

(51) Int. Cl.
*H01G 9/048* (2006.01)
*H01G 9/025* (2006.01)
(Continued)

(52) U.S. Cl.
CPC ............. *H01G 9/048* (2013.01); *H01G 9/025* (2013.01); *H01G 9/055* (2013.01); *H01G 9/15* (2013.01); *H01G 9/045* (2013.01)

(58) Field of Classification Search
None
See application file for complete search history.

(56) References Cited

U.S. PATENT DOCUMENTS

| | | | |
|---|---|---|---|
| 2004/0212950 A1 | 10/2004 | Ozawa et al. | |
| 2022/0148815 A1 | 5/2022 | Yoshimura et al. | |
| 2023/0335341 A1* | 10/2023 | Yoshimura | H01G 9/151 |

FOREIGN PATENT DOCUMENTS

| | | |
|---|---|---|
| JP | H02-189912 A | 7/1990 |
| JP | H05-148700 A | 6/1993 |

(Continued)

OTHER PUBLICATIONS

International Search Report dated Nov. 22, 2022, issued in counterpart International Application No. PCT/JP2022/033070 (5 pages).

*Primary Examiner* — Eric W Thomas
(74) *Attorney, Agent, or Firm* — WHDA, LLP

(57) ABSTRACT

An electrode foil for an electrolytic capacitor includes a porous portion, and a core portion continuous with the porous portion. When the porous portion is equally divided in three in the thickness direction of the porous portion into a first region, a second region, and a third region sequentially from the outer surface side of the porous portion, $1.1 \leq L2/L1$, and $1.1 \leq L2/L3$ are satisfied, where the L1 represents a pit perimeter length in the first region, the L2 represents a pit perimeter length in the second region, and the L3 represents a pit perimeter length in the third region.

9 Claims, 4 Drawing Sheets

(51) Int. Cl.
  *H01G 9/055* (2006.01)
  *H01G 9/15* (2006.01)
  *H01G 9/045* (2006.01)

(56) References Cited

FOREIGN PATENT DOCUMENTS

| | | | | |
|---|---|---|---|---|
| JP | 2002-359165 | A | 12/2002 | |
| JP | 2006222333 | A * | 8/2006 | ............. G08B 21/06 |
| JP | 2018-125322 | A | 8/2018 | |
| JP | 2019-133983 | A | 8/2019 | |
| WO | 2020/174751 | A1 | 9/2020 | |
| WO | WO-2023042594 | A1 * | 3/2023 | ............... H01G 9/15 |

* cited by examiner

ELECTRODE FOIL FOR HIGH-PERFORMANCE ELECTROLYTIC CAPACITORS WITH HIGH RELIABILITY

CROSS REFERENCE TO RELATED APPLICATIONS

This Application is the National Stage of International Application No. PCT/JP2022/033070, filed on Sep. 2, 2022, which claims priority from Application No. 2021-150429 filed on Sep. 15, 2021 in Japan. The entire contents of these applications are incorporated herein by reference in their entirety.

TECHNICAL FIELD

The present disclosure relates to an electrode foil for an electrolytic capacitor, and an electrolytic capacitor.

BACKGROUND ART

For the anode body of an electrolytic capacitor, for example, a metal foil containing a valve metal is used. In order to increase the capacitance of an electrolytic capacitor, the principal surface of the metal foil is etched into a porous portion. The metal foil is then subjected to a chemical conversion treatment, to form a metal oxide (dielectric) layer on the surface of a metal framework constituting the porous portion.

Patent Literature 1 proposes an electrolytic capacitor including a capacitor element which includes an anode foil using an etched foil with a porosity of 51% or less. The capacitor element contains a bonded body of a water-soluble metal complex bonded with phosphate ions, and a solvent mainly composed of water.

Citation List

Patent Literature

Patent Literature 1: Japanese Laid-Open Patent Publication No. 2002-359165

SUMMARY OF INVENTION

Technical Problem

Further improvement in the performance of an electrolytic capacitor is required.

Solution to Problem

One aspect of the present disclosure relates to an electrode foil for an electrolytic capacitor, including: a porous portion; and a core portion continuous with the porous portion, wherein $1.1 \leq L2/L1$, and $1.1 \leq L2/L3$ are satisfied, where when the porous portion is equally divided in three in a thickness direction of the porous portion into a first region, a second region, and a third region sequentially from an outer surface side of the porous portion, the L1 represents a pit perimeter length in the first region, the L2 represents a pit perimeter length in the second region, and the L3 represents a pit perimeter length in the third region.

Another aspect of the present disclosure relates to an electrolytic capacitor, including: the above-described electrode foil for an electrolytic capacitor, the electrode foil including a dielectric layer covering at least part of a surface of a metal framework constituting the porous portion; and a cathode section covering at least part of the dielectric layer.

Advantageous Effects of Invention

According to the present disclosure, it is possible to obtain a high-performance electrolytic capacitor having high reliability.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
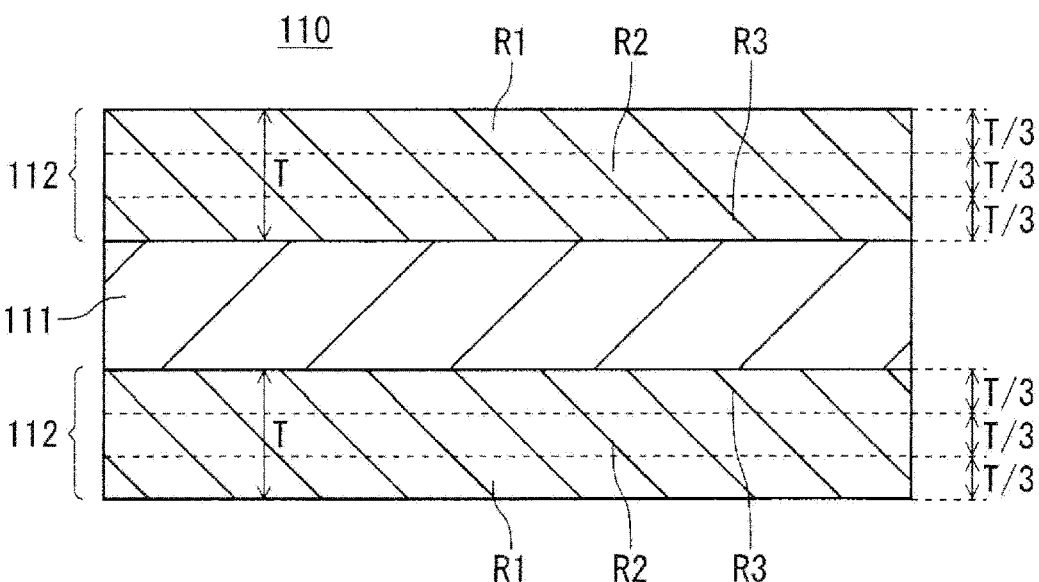
FIG. 1 A schematic cross-sectional view of an electrode foil (anode body) according to an embodiment of the present disclosure.

Embodiments of the present disclosure will be described below by way of examples, but the present disclosure is not limited to the examples described below. In the following description, specific numerical values and materials are exemplified in some cases, but other numerical values and other materials may be adopted as long as the effects of the present disclosure can be obtained. In the present specification, the phrase "a numerical value A to a numerical value B" means to include the numerical value A and the numerical value B, and can be rephrased as "a numerical value A or more and a numerical value B or less." In the following description, when the lower and upper limits of numerical values related to specific physical properties, conditions, etc. are mentioned as examples, any one of the mentioned lower limits and any one of the mentioned upper limits can be combined in any combination as long as the lower limit is not equal to or more than the upper limit. When a plurality of materials are mentioned as examples, one kind of them may be selected and used singly, or two or more kinds of them may be used in combination.

The present disclosure encompasses a combination of matters recited in any two or more claims selected from plural claims in the appended claims. In other words, as long as no technical contradiction arises, matters recited in any two or more claims selected from plural claims in the appended claims can be combined.

In the following description, the term "comprise" or "include" is an expression including meanings of "comprise (or include)," "essentially consist of," and "consist of." The electrolytic capacitor encompasses an electrolytic capacitor having an electrolyte solution, a solid electrolytic capacitor having a solid electrolyte, an electrolytic capacitor having both an electrolyte solution or a liquid component and a solid electrolyte, and the like. A capacitor may be rephrased as a "condenser."

In the following, the electrode foil for an electrolytic capacitor before forming a dielectric layer is sometimes referred to as a "first electrode foil" or an "anode body," and the electrode foil for an electrolytic capacitor having a dielectric layer is sometimes referred to as a "second electrode foil."

(First Electrode Foil)

An electrode foil for an electrolytic capacitor (first electrode foil) according to the present embodiment includes a porous portion and a core portion continuous with the porous portion. That is, the first electrode foil is an integrally formed body of a core portion and a porous portion. The first electrode foil can be used as an anode body of an electrolytic capacitor. A metal portion constituting the porous portion and the core portion include a first metal.

The first electrode foil is obtained by, for example, applying etching or the like to part of a metal foil formed of a first metal, which is a metal contained in the metal portion constituting the porous portion, to surface-roughen the metal foil. The porous portion is a portion on the surface side (outer side) of the metal foil made porous by etching, and the remaining portion, which is the inner portion of the metal foil, is the core portion. The porous portion has pits (or pores) surrounded by the metal portion containing the first metal.

When the porous portion is equally divided in three in the thickness direction of the porous portion into a first region, a second region, and a third region sequentially from the outer surface side (side opposite to the core portion) of the porous portion, $1.1 \leq L2/L1$, and $1.1 < L2/L3$ are satisfied, where the L1 represents a pit perimeter length in the first region, the L2 represents a pit perimeter length in the second region, and the L3 represents a pit perimeter length in the third region. In the present specification, when the L2 is larger than the L1 (L3), this means that the L2 is 1.1 times or more as large as the L1 (L3). When the L1 (L3) is smaller than the L2, this means that the L1 (L3) is 1/1.1 times or less as large as the L2.

The "pit perimeter length" herein means the length of a contour of an area occupied by pits in a thickness-wise cross section of the electrode foil (porous portion), and is expressed as a total length of the above contours included per unit area of the above cross section. The larger the pit perimeter length is, the larger the surface area of the electrode foil tends to be. The greater the number of pits with small diameters is, the larger the pit perimeter length is.

When the L1 to the L3 satisfy the above relationship, a high-performance electrode foil having high strength can be obtained. That is, by setting the L2 sufficiently large, the surface area of the porous portion can be effectively increased for achieving larger capacitance.

When the L1 is smaller than the L2, a good dielectric layer can be formed into a deep part of the porous portion (second and third regions), and a high-performance second electrode foil can be obtained. Furthermore, in an electrolytic capacitor including an electrolyte solution, a solid electrolyte, or the like as a cathode material, the permeability of the electrolyte solution into the porous portion and the packability of the solid electrolyte (e.g., a conductive polymer) become favorable. This increases the capacitance achievement rate of the electrolytic capacitor, and also is advantageous in reducing ESR and suppressing leakage current.

When the L1 and the L3 are smaller than the L2, the folding endurance of the electrode foil is improved. When such a relationship is satisfied, the resistance to bending stress is improved in the second region, and the above stress is concentrated in the second region and relaxed in the first region and the third region. Moreover, when the L2 is larger than the L1 and the L3, the rigidity of the porous portion as a whole is improved, and the tensile strength of the electrode foil is improved. That is, high tensile strength and high folding endurance of the electrode foil as a whole can be both realized. As a result, foil breakage during production of an electrolytic capacitor (e.g., in the process of fabricating a wound body) is suppressed, and the reliability of the electrolytic capacitor is improved. The pit perimeter lengths L1 to L3 in the first to third regions of the porous portion of the first electrode foil can be determined as follows.

(i) An image of a thickness-wise cross section of the first electrode foil (anode body) is obtained using an electron microscope. As the electron microscope, a scanning electron microscope (SEM) or a transmission electron microscope (TEM) can be used.

(ii) Image processing is performed. First, filtering processing is performed, to remove noise. This is followed by binarization processing, to distinguish between the pits (voids) and the metal framework constituting the porous portion, and extract the edge of the metal framework (the contour of the area occupied by pits).

(iii) In a cross section of the porous portion having a thickness of T ($\mu$m), a region having a width of T/9 extending in the thickness direction of the porous portion is arbitrarily selected. The region is divided into nine equal parts in the thickness direction of the porous section, which are defined as first to ninth sections from the outer surface side of the porous portion (first electrode foil). That is, the first to ninth sections are each a T/9 by T/9 square section (e.g., size: 9 $\mu$m$^2$ to 64 $\mu$m$^2$), which are arranged in a line in the thickness direction of the porous portion. The first to the third sections correspond to the first region, the fourth to the sixth sections correspond to the second region, and the seventh to the ninth sections correspond to the third region.

(iv) A total length of the contours of the areas occupied by pits within the first section is determined as a pit perimeter length L9-1 in the first section. As for the second to ninth sections, in a similar manner to the above, pit perimeter lengths L9-2 to L9-9 in the second to ninth sections are determined, respectively. An average value of the pit perimeter lengths L9-1 to L9-3 in the first to third sections is calculated as the pit perimeter length L1 in the first region. An average value of the pit perimeter lengths L9-4 to L9-6 in the fourth to sixth sections are calculated as the pit perimeter length L2 in the second region. An average value of the pit perimeter lengths L9-7 to L9-9 in the seventh to ninth sections is calculated as the pit perimeter length L3 in the third region.

The L2/L1 may be 1.2 or more, may be 1.3 or more, may be 1.1 or more and 2.0 or less, and may be 1.2 or more (or 1.3 or more) and 2.0 or less. The L2/L3 may be 1.2 or more, may be 1.3 or more, may be 1.1 or more and 2.0 or less, and may be 1.2 or more (or 1.3 or more) and 2.0 or less.

Preferably, $2 \times L2/(L1+L3)$ is 1.2 or more, and may be 1.2 or more and 1.4 or less. In this case, larger capacitance can be achieved, and high folding endurance and high tensile strength can be obtained.

In view of improving the strength of the surface layer of the porous portion, $1 < L1/L3$ may be satisfied. In view of forming a dielectric layer using a chemical conversion solution or by a vapor phase method, $L1/L3 < 1$ may be satisfied. That is, in the third region than in the first region, the pit diameter may be relatively smaller, and the surface area may be larger. This makes it easy to ensure a sufficiently large capacitance even if the surface area near the surface of the anode body (e.g., the first region) is relatively small. The $L1/L3$ may be, for example, 0.75 or more and 1.25 or less.

The L2 may be, for example, 145 $\mu m/\mu m^2$ or more, and may be 145 $\mu m/\mu m^2$ or more and 165 $\mu m/\mu m^2$ or less. In this case, the L1 may be less than 140 $\mu m/\mu m^2$, may be 130 $\mu m/\mu m^2$ or less, and may be 110 $\mu m/\mu m^2$ or more and less than 140 $\mu m/\mu m^2$. The L3 may be 130 $\mu m/\mu m^2$ or less, may be 125 $\mu m/\mu m^2$ or less, and may be 105 $\mu m/\mu m^2$ or more and 130 $\mu m/\mu m^2$ or less.

In view of the strength and the impregnation of electrolyte, in the first region of the first electrode foil, the pit perimeter length may be larger as closer to the second region. That is, the pit perimeter lengths L9-1 to L9-3 in the first to the third sections may have a relationship of L9-1 <L9-2 <L9-3. In this case, the pit perimeter length L9-1 in the first section is preferably 90 $\mu m/\mu m^2$ or more and 125 $\mu m/\mu m^2$ or less. In this case, the dielectric layer is likely to be formed into the deepest part of the porous portion, and the impregnation of electrolyte into the electrode foil is likely to be improved.

In view of the strength and the impregnation of electrolyte, in the third region of the first electrode foil, the pit perimeter length may be larger as closer to the second region. That is, the pit perimeter lengths L9-7 to L9-9 in the seventh to the ninth sections may have a relationship of L9-9 <L9-8 <L9-7.

The pit perimeter length of any one of the pit perimeter lengths L9-4 to L9-6 in the fourth to the sixth sections of the second region can be the largest value (maximum value) Lmax of the pit perimeter length in the first to the ninth sections. The largest value Lmax of the pit perimeter length may be, for example, 150 $\mu m/\mu m^2$ or more, or 150 $\mu m/\mu m^2$ or more and 170 $\mu m/\mu m^2$ or less.

The ratio Lmax/L9-1 of the largest pit perimeter length Lmax to the pit perimeter length L9-1 in the first section is, for example, 1.25 or more (or 1.5 or more) and 2.0 or less. The ratio Lmax/L9-9 of the maximum pit perimeter length Lmax to the pit perimeter length L9-9 in the ninth section is, for example, 1.35 or more (or 1.5 or more) and 2.0 or less.

FIG. 1 is a schematic cross-sectional view of an anode body (first electrode foil) according to an embodiment of the present invention. The anode body 110 is an integrally formed body of a core portion 111 and porous portions 112, and the porous portions 112 each have a thickness T. The porous portions 112 can be each equally divided in three into a first region R1, a second region R2, and a third region R3, each having a thickness of T/3, sequentially from the side opposite to the core portion 111. The pit perimeter length L1 in the first region R1, the pit perimeter length L2 in the second region R2, and the pit perimeter length L3 in the third region R3 satisfy $1.1 \leq L2/L1$, and $1.1 \leq L2/L3$.

(Second Electrode Foil)

An electrode foil for an electrolytic capacitor according to the present embodiment may be a second metal foil having a first electrode foil (or anode body) and a dielectric layer covering at least part of the surface of a metal portion (metal framework) that constitutes the porous portion of the first electrode foil. The configuration of the dielectric layer has no particular limitation.

In the second electrode foil, the thickness of the dielectric layer is, although different depending on the rated voltage of the electrolytic capacitor, 4 nm to 300 nm, and the dielectric layer is formed relatively thinly along the geometry of the surface of the metal portion. Therefore, in the thickness direction of the porous portions of the second electrode foil, when the porous portions are each equally divided in three into a first region, a second region, and a third region sequentially from the outer surface side (side opposite to the core portion) of the porous portion (second electrode foil), the ratio D2/D1 of a pit perimeter length D2 in the second region to a pit perimeter length D1 in the first region is approximately equal to the L2/L1. The ratio D2/D3 of the pit perimeter length D2 in the second region to a pit perimeter length D3 in the third region is approximately equal to the L2/L3. Therefore, when the L2/L1 and the L2/L3 are each 1.1 or more in the first electrode foil, the D2/D1 and the D2/D3 can be each 1.1 or more in the second electrode foil. The above D1 to D3 can be determined in a similar manner to the above L1 to L3.

The dielectric layer is provided so as to cover at least part of the surface of the metal portion surrounding the pits (or pores). The dielectric layer may include an oxide of the first metal contained in the metal portion. The formation of a dielectric layer including an oxide of the first metal is performed by, for example, chemical conversion treatment using a chemical conversion solution. When the L2 is larger than the L1, the chemical conversion solution can be easily impregnated into a deep part of the porous portion, which can facilitate the formation of a dielectric layer.

The dielectric layer may include a first layer having a thickness T1 including an oxide of a second metal different from the first metal contained in the metal portion. When the dielectric layer includes an oxide of a second metal different from the first metal, for example, the second metal with a high dielectric constant can be selected without restrictions by the first metal. Therefore, the capacitance of the electrolytic capacitor is likely to be easily improve. Moreover, since the second metal becomes able to be selected from a wider range, various performances can be imparted to the dielectric layer without restrictions by the first metal.

When the L2 is larger than the L1, in forming a dielectric layer by a vapor phase method, such as atomic layer deposition, the raw material gas of the dielectric layer is likely to diffuse deep into the porous portion, and a good dielectric layer can be formed into a deep part of the porous portion (second and third regions). For example, even when the oxide of a second metal is preferentially deposited on the surface layer (i.e., the first region) of the porous portion at the early stage of forming a dielectric layer, the entrances of the pits are less likely to be blocked by the dielectric layer, since the L1 is larger than the L2, and the pit diameter is larger in the first region than in the second region. Therefore, the film formation of a dielectric layer proceeds favorably. As a result, higher capacitance of the electrode foil can be achieved, and simultaneously therewith, the permeability of the electrolyte solution into the porous portion and the packability of the solid electrolyte (e.g. conductive polymer) become favorable. Also, the capacitance achievement rate of the electrolytic capacitor is increased. It is also advantageous in reducing ESR and suppressing the leakage current.

In view of facilitating the formation of a dielectric layer in the third region (deepest part) and improving the impregnation of electrolyte, the L2 may be 160 $\mu m/\mu m^2$ or less (or 155 $\mu m/\mu m^2$ or less). The maximum value Lmax of the pit perimeter length in the fourth to sixth sections may be 170 $\mu m/\mu m^2$ or less (or 160 um/um2 or less).

In a vapor phase method, the raw material gas is consumed first in the surface layer part (first region) of the etched pits, so that the amount of raw material gas reaching the deepest part (third region) is reduced. On the other hand, the L1 is smaller than the L2, and therefore, the raw material gas can easily enter the etched pits. Furthermore, the L3 is smaller than the L2, and the third region has a smaller surface area than the second region. Therefore, the amount of raw material gas required to form a dielectric layer may be small. Thus, a good dielectric layer can be efficiently formed into the deepest part of the etched pits. For example, even when the pits have a sponge-like shape with a large specific surface area increased by 50 times or more, a dielectric layer can be easily formed into their deepest part.

The pit perimeter lengths L1 to L3 in the first to third regions and the pit perimeter length L9-1 in the first section may be within the ranges exemplified above. In this case, when a dielectric layer is formed using a liquid phase, such as chemical conversion (anodization), the chemical conversion solution can be easily impregnated into a deep part of the porous portion. Furthermore, when the dielectric layer is formed by a vapor phase method, such as an atomic layer deposition method, the diffusion of the raw material gas of the dielectric layer into a deep part of the porous portion is further improved.

The thickness of the porous portion is not particularly limited, and may be appropriately selected depending on the use of the electrolytic capacitor, the required withstand voltage, etc. The thickness of the porous portion may be selected, for example, from a range of 10 μm to 160 μm. The thickness of the porous portion may be, for example, 1/10 or more and 5/10 or less of the thickness of the first or second electrode foil.

The thickness T of the porous portion is determined by cutting the first or second electrode foil in such a manner that a thickness-wise cross section including the core portion and the porous portion can be obtained, and taking an electron micrograph of the cross section, to calculate an average value of the thicknesses at any 10 points of the porous portion.

The pit diameter peak of the pits (or the pore diameter peak of the pores) included in the porous portion is not particularly limited, but in view of increasing the surface area and forming a dielectric layer into a deep part of the porous portion, is set to, for example, 50 nm to 2000 nm, and may be set to 100 nm to 300 nm. The pit diameter (pore diameter) peak is, for example, the most frequent pore diameter in a volume-based pore size distribution measured with a mercury porosimeter.

The withstand voltage of the electrolytic capacitor is not particularly limited, and may be, for example, a relatively small withstand voltage of 1 V or more and less than 4 V, and may be a relatively large withstand voltage of 4 V or more, 15 V or more, or 100 V or more. In obtaining an electrolytic capacitor having a withstand voltage of 4 V or more, the thickness of the dielectric layer is preferably set to 4 nm or more. In obtaining an electrolytic capacitor having a withstand voltage of 15 V or more, the thickness of the dielectric layer is preferably set to 21 nm or more.

More specifically, for obtaining an electrolytic capacitor having a large withstand voltage of, for example, 60 V or more, the pore diameter peak of the porous portion is set to, for example, 50 to 300 nm, the thickness of the porous portion is set to, for example, 30 to 160 um, and the thickness of the dielectric layer is set to, for example, 30 to 100 nm.

For obtaining an electrolytic capacitor whose withstand voltage is relatively low, for example, 10 V or less, the peak pore diameter of the porous portion is set to, for example, 20 to 200 nm, the thickness of the porous portion is set to, for example, 30 to 160 μm, and the thickness of the dielectric layer is set to, for example, 4 to 30 nm.

The first metal may include, for example, Al. In this case, the second metal may include, for example, at least one selected from the group consisting of Ta, Nb, Ti, Si, Zr, and Hf.

In the dielectric layer, an oxide of the first metal may be disposed between the metal portion containing the first metal and the oxide of the second metal. In the following, of the dielectric layer, a portion formed by an oxide containing the second metal is sometimes referred to as a first layer, and a portion formed by an oxide containing the first metal is sometimes referred to as a second layer.

For example, an oxide of the second metal (first layer) may be formed on a natural oxide film of the first metal formed on the surface of the metal portion. Alternatively, after forming a first layer on the natural oxide film, the metal portion may be anodized, so that an oxide of the first metal (second layer) of any thickness is formed between the metal portion and the oxide of the second metal (first layer).

The second layer may include a composite oxide of an oxide of the first metal and an oxide of the second metal. With the second layer, even when there are defects in the first layer, the defects can be repaired. This further improves the performance of the dielectric layer.

At least in the third region, the thickness T1 of the first layer and the thickness T2 of the second layer may satisfy $T1 \geq 2 \times T2$, and satisfy $T1 \geq 3 \times T2$. By setting the thickness of the first layer relatively large as above, when, for example, a second metal with a high dielectric constant is selected, the capacitance of the electrolytic capacitor can be significantly improved. Note that, according to the above configuration of the porous portion, the raw material gas is allowed to easily reach a further deeper part, and therefore, $T1>T2$ can be satisfied in the first region, too.

The thicknesses of the first layer and the second layer can be determined by cutting the anode body in such a manner that a thickness-wise cross section of the porous portion can be obtained, and taking an electron micrograph of the cross section, to calculate an average value of the thicknesses at any 10 points of the first or second layer.

The first layer preferably contains at least one additive element selected from the group consisting of C, P, B, and N. The additive element is preferably distributed to a depth of at least $0.05 \times T1$ (thickness of the first layer) from the surface of the first layer. This makes it possible to impart sufficient acid resistance to the dielectric layer and to sufficiently reduce the leakage current. The first layer is formed of a dielectric containing an oxide of a second metal different from the first metal. The second metal can form a dielectric with a high dielectric constant, but during its formation process, defects of the dielectric layer that can cause an increase in leakage current tend to occur. The additive element can enter into the defects, and this can impart acid resistance to the dielectric layer, and thus can suppress the increase in leakage current. In the electrolytic capacitor according to the present embodiment, the above element can be efficiently added to the dielectric layer.

A method for producing an electrode foil for an electrolytic capacitor includes, for example, a process of preparing a metal foil containing a first metal, and a process of surface-roughening the metal foil. The surface roughening process includes an etching process of etching the metal foil. As a result of surface roughening, a porous portion having a plurality of pits (or pores) is formed on the surface side of the metal foil. Simultaneously therewith, a core portion integral with the porous portion is formed in the inner part of the metal foil. The etching may be, for example, DC etching with direct current or AC etching with alternating current.

The etching process may include a plurality of steps. For example, a plurality of etching tanks holding an etching solution may be arranged, or a roll-to-roll method may be employed. For example, by changing the etching current (current density, frequency), the temperature of the etching solution, etc. according to the step performed, the pit perimeter lengths of the first to third regions (first to ninth sections) can be controlled. The etching current, etc. may be changed continuously or stepwise. For example, the frequency may be decreased as the etching process proceeds. This can shift the starting point where the pits are formed to a deeper part of the electrode foil. The current density may be decreased, or the etching temperature may be decreased as the etching process proceeds. This can make finer the geometry of the pits. Also, the etching solution (concentration, major component) or the application time of the etching current may be changed according to the step performed. The etching solution contains, for example, hydrochloric acid as a major component.

The etching may be temporarily interrupted during the etching process (a plurality of steps), to perform an intermediate treatment process of immersing in an acid processing solution containing a phosphorus compound (e.g., an aqueous potassium phosphate solution). During the intermediate treatment process, a protective layer is partially formed on the inner wall surfaces of the pits in the porous portion, and in the region where the protective layer is formed, the growth of pits is suppressed. The pit perimeter length (pit diameter) may be controlled by performing the intermediate treatment process. The area where the protective layer is formed may be controlled by changing the timing and the number of times of performing the intermediate treatment process, the immersing time, etc.

For example, when the etching process is performed under constant conditions without changing the etching current, etc., the pit perimeter length (pit diameter) will be almost uniform in the thickness direction of the porous portion, and the L2/L1 and the L2/L3 will be each less than 1.1.

The first metal may be of any kind, but in terms of the ease of formation of a dielectric layer or a second layer through chemical conversion, a valve metal, such as aluminum (Al), tantalum (Ta), and niobium (Nb), or an alloy containing a valve metal can be used. The thickness of the metal foil is, although not particularly limited, for example, 15 μm or more and 300 μm or less.

The method for producing an electrode foil for an electrolytic capacitor may further include a process of forming a dielectric layer covering the metal portion constituting the porous portion of the electrode foil.

The process of forming a dielectric layer may be, for example, a process of chemically converting (anodizing) the anode body (first electrode foil). For example, with the first electrode foil immersed in a chemical conversion solution, such as an ammonium adipate solution, an ammonium phosphate solution, and an ammonium borate solution, a voltage is applied to the first electrode foil. A second electrode foil having a dielectric layer formed on the surface of the metal portion can be thus obtained.

The process of forming a dielectric layer may be, for example, a process of depositing an oxide of a second metal different from the first metal contained in the metal portion on the surface of the metal portion by a vapor phase method, to form a first layer having a thickness T1. A second electrode foil having a dielectric layer formed on the surface of the metal portion can be thus obtained.

Examples of the second metal include Al, Ta, Nb, silicon (Si), titanium (Ti), zirconium (Zr), and hafnium (Hf). These may be used singly or in combination of two or more. That is, in the first layer, $Al_2O_3$, $Ta_2O_5$, $Nb_2O_5$, $SiO_2$, $TiO_2$, $ZrO_2$, $HfO_2$, etc. may be contained singly or in combination of two or more. When the first layer contains an oxide of two or more kinds of second metals, the two or more oxides may be mixed or may be arranged in layers. In view of increasing the capacitance of the electrolytic capacitor, it is preferable that the second metal oxide has a higher dielectric constant than the first metal oxide. In view of improving the withstand voltage of the electrolytic capacitor, the second metal is preferably Ta, Ti, Si, and the like.

The vapor phase method may be, for example, a vacuum vapor deposition, a chemical vapor deposition, a mist vapor deposition, a sputtering, a pulsed laser deposition, or an atomic layer deposition (Atomic Layer Deposition: ALD) method. In particular, an ALD method is superior in that a dense dielectric layer can be formed into a deep part of the porous portion. The thickness of the first layer may be, although not particularly limited, for example, 0.5 nm or more and 200 nm or less, or 5 nm or more and 200 nm or less.

Figure 2:
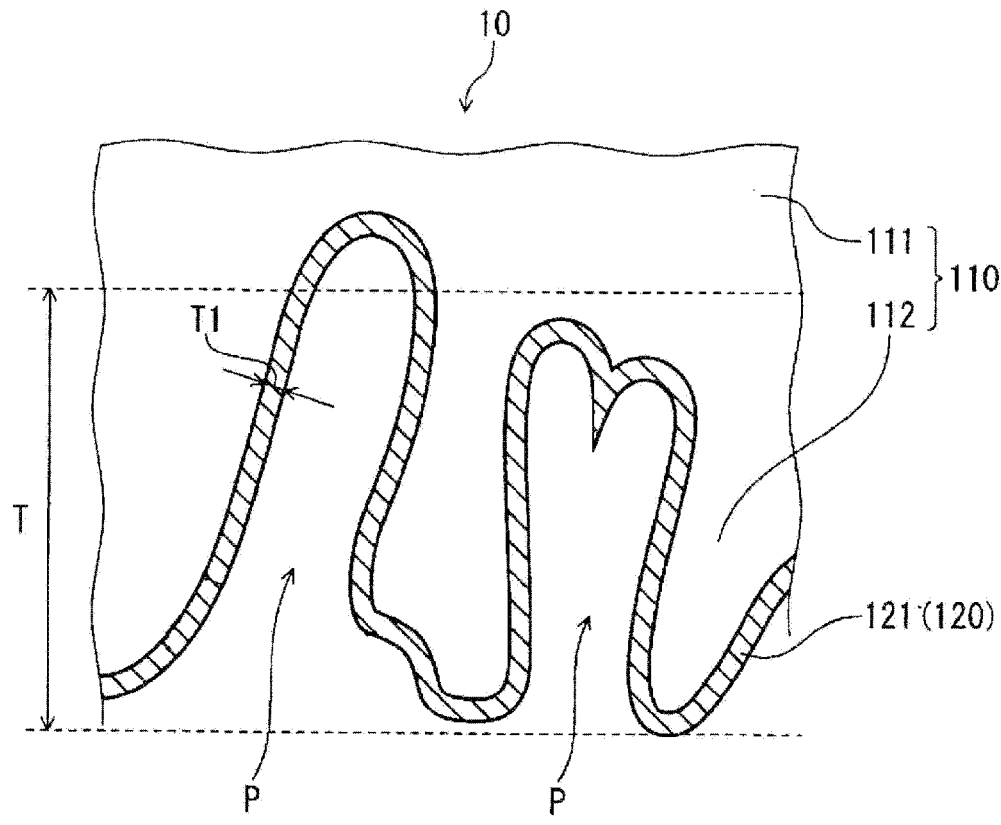
FIG. 2 A partially enlarged schematic cross-sectional view showing a porous portion of an electrode foil having a dielectric layer according to an embodiment of the present disclosure.

FIG. 2 shows an example of an anode foil 10 that includes an anode body 110 which is an integrally formed body of a core portion 111 and a porous portion 112, and a dielectric layer 120 covering the surface of a metal portion that constitutes the porous portion 112. FIG. 2 is a partially enlarged schematic cross-sectional view showing the porous portion 112 having a first layer 121 only as the dielectric layer 120.

The porous portion 112 has a large number of pits (or pores) P surrounded by the metal portion. The dielectric layer 120 (first layer 121) is provided so as to cover at least part of the surface of the metal portion. The first layer 121 includes an oxide of a second metal different from the first metal contained in the metal portion, and has a thickness denoted by T1. The dielectric layer 120 is constituted of the first layer 121, but may be a layer (chemical conversion film) containing an oxide of the first metal.

(Electrolytic Capacitor)

An electrolytic capacitor according to the present embodiment includes a second electrode foil, and a cathode section covering at least part of the dielectric layer in the second electrode foil.

The cathode section may include an electrolyte. The electrolyte covers at least part of the dielectric layer. When the L2/L1 and the L2/L3 (D2/D1 and D2/D3) are each 1.1 or more, the electrolyte can easily impregnate into the third region.

The electrolyte includes at least one of a solid electrolyte and an electrolyte solution. The cathode section may include a solid electrolyte and an electrolyte solution, or may include a solid electrolyte and a nonaqueous solvent. In the following, the electrolytic solution and the nonaqueous solvent is sometimes collectively referred to as a "liquid component." The dielectric layer can be covered with a solid electrolyte (or electrolyte solution) by, for example, impregnating the second electrode foil (or wound body) with a processing solution (or electrolyte solution) containing a conductive polymer. The processing solution may include a nonaqueous solvent. When the L2/L1 and the L2/L3 (D2/D1 and D2/D3)

are each 1.1 or more, the impregnation of the processing solution (or electrolyte solution) into the porous portion becomes favorable, and the retention of the processing solution (or electrolyte solution) after impregnation into the porous portion is also improved.

The solid electrolyte includes a conductive polymer. The conductive polymer may be, for example, a π-conjugated polymer. Examples of the conductive polymer include polypyrrole, polythiophene, polyfuran, and polyaniline. The conductive polymer may be used singly, or in combination of two or more, or may be a copolymer of two or more monomers. The conductive polymer has a weight average molecular weight of, for example, 1,000 to 100,000.

In the present specification, polypyrrole, polythiophene, polyfuran, polyaniline, etc. mean polymers whose backbones are polypyrrole, polythiophene, polyfuran, polyaniline, etc., respectively. Therefore, polypyrrole, polythiophene, polyfuran, polyaniline, etc. may also include their respective derivatives. For example, polythiophene includes poly (3,4-ethylenedioxythiophene) (PEDOT) and the like.

The conductive polymer can be doped with a dopant. The solid electrolyte may contain a dopant together with the conductive polymer. Examples of the dopant include polystyrene sulfonic acid (PSS). The solid electrolyte may further contain an additive as necessary.

The liquid component is in contact with the dielectric layer directly or via the conductive polymer. The liquid component may be a nonaqueous solvent or an electrolyte solution. The electrolyte solution contains a nonaqueous solvent and an ionic material (a solute (e.g., organic salt)) dissolved in the nonaqueous solvent. The nonaqueous solvent may be an organic solvent or an ionic liquid.

As the nonaqueous solvent, a solvent with high boiling point is preferred. Examples thereof include polyol compounds such as ethylene glycol, sulfone compounds such as sulfolane, lactone compounds such as γ-butyrolactone, ester compounds such as methyl acetate, carbonate compounds such as propylene carbonate, ether compounds such as 1,4-dioxane, and ketone compounds such as methylethylketone.

The liquid component may contain an acid component (anion) and a base component (cation). An acid component and a base component may form a salt (solute). The acid component contributes to the film repair function. Examples of the acid component include organic carboxylic acids and inorganic acids. The inorganic acids are exemplified by phosphoric acid, boric acid, and sulfuric acid. Examples of the base component include primary to tertiary amine compounds.

The organic salt is a salt in which at least one of the anion and the cation includes an organic substance. Examples of the organic salt include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate.

In view of suppressing de-doping of the dopant from the conductive polymer (deterioration of the solid electrolyte), the liquid component preferably contains the acid component more than the base component. Also, in the point that the acid component contributes to the film repair function of the liquid component, the liquid component preferably contains the acid component more than the base component. The molar ratio (acid component/base component) of the acid component to the base component is, for example, 1.1 or more. In view of suppressing de-doping of the dopant from the conductive polymer, the pH of the liquid component may be 6 or less, and may be 1 or more and 5 or less.

Figure 3:
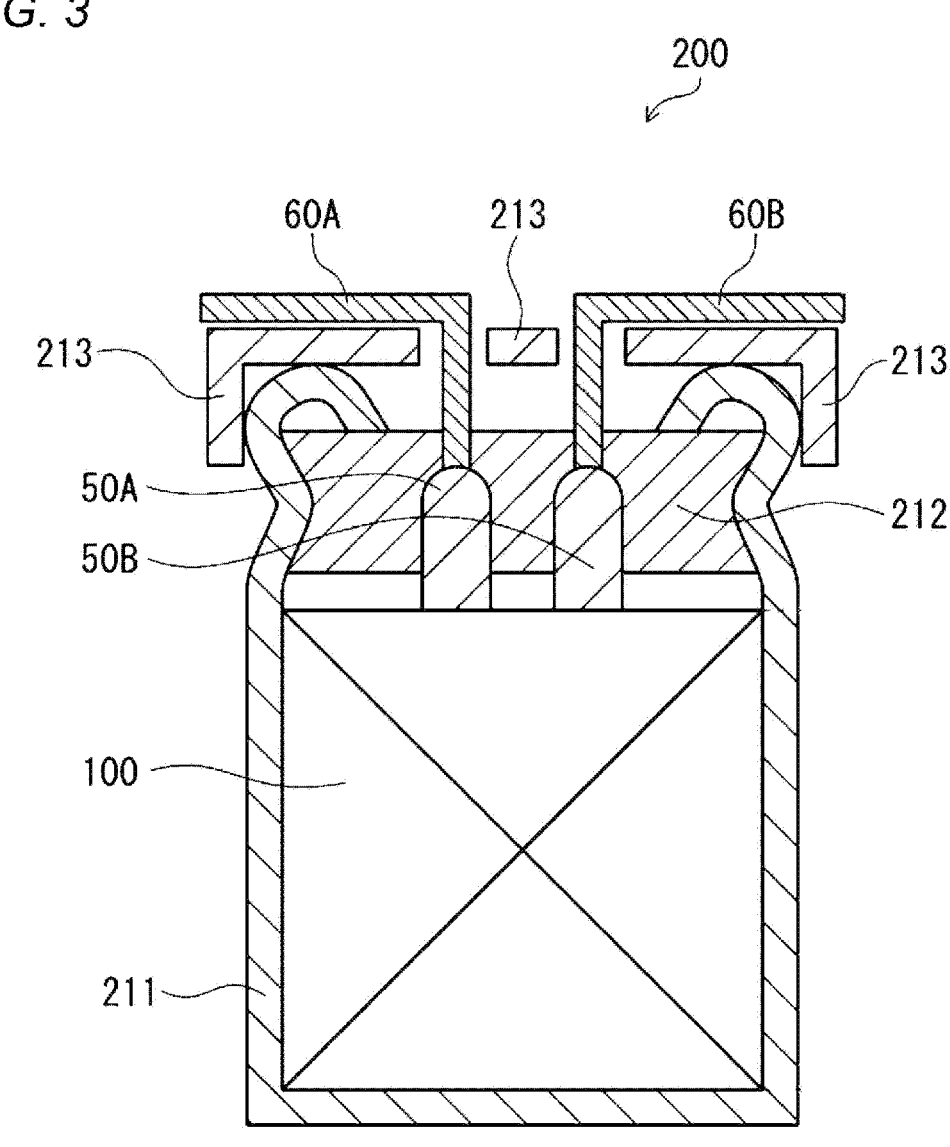
FIG. 3 A schematic cross-sectional view of an electrolytic capacitor according to an embodiment of the present disclosure.
Figure 4:
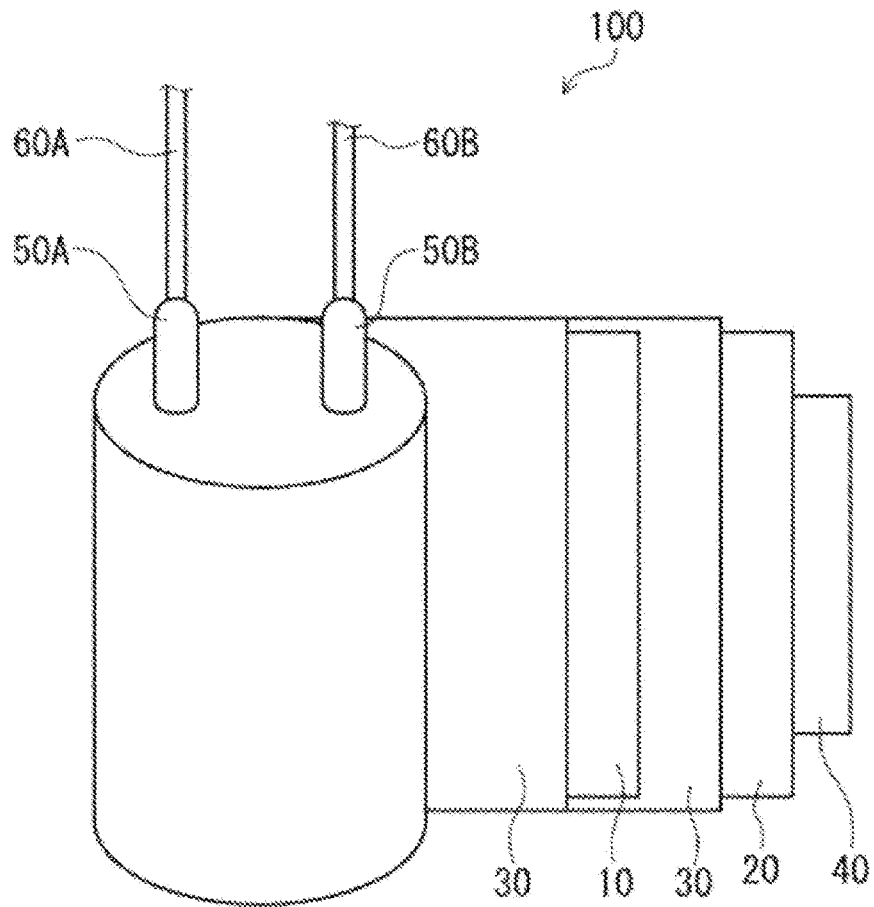
FIG. 4 A schematic oblique view showing a structure of the wound body of FIG. 3.

Here, FIG. 3 is a schematic cross-sectional view of an electrolytic capacitor according to an embodiment of the present invention. In FIG. 3, an example of an electrolytic capacitor including a wound capacitor element is shown. FIG. 4 is a schematic oblique view showing a structure of the wound body of FIG. 3.

An electrolytic capacitor 200 includes a wound body 100. The wound body 100 is obtained by winding an anode foil 10 and a cathode foil 20, with a separator 30 interposed therebetween. The separator 30 is not limited to a particular one, and may be, for example, a nonwoven fabric containing fibers of cellulose, polyethylene terephthalate, vinylon, polyamide (e.g., aliphatic polyamide, aromatic polyamide such as aramid), and the like.

One ends of lead tabs 50A and 50B are connected to the anode foil 10 and the cathode foil 20, respectively, and the wound body 100 is fabricated, with the lead tabs 50A and 50B wound together. Lead wires 60A and 60B are connected to the other ends of the lead tabs 50A and 50B, respectively.

A winding stop tape 40 is disposed on the outer surface of the cathode foil 20 at the outermost layer of the wound body 100, so that the end of the cathode foil 20 is secured with the winding stop tape 40. Note that when the anode foil 10 is prepared by cutting it out from a large foil, the wound body 100 may be further subjected to a chemical conversion treatment in order to provide a dielectric layer on the cut surface.

The wound body 100 contains an electrolyte, and the electrolyte is interposed between the anode foil 10 (dielectric layer) and the cathode foil. The wound body 100 containing an electrolyte is formed by, for example, impregnating the wound body 100 with a processing solution (or an electrolyte solution) containing a conductive polymer. The impregnation may be performed under reduced pressure, for example, in an atmosphere of 10kPa to 100 kPa.

The wound body 100 is housed in a bottomed case 211 such that the lead wires 60A and 60B are on the opening side of the bottomed case 211. As the material of the bottomed case 211, a metal, such as aluminum, stainless steel, copper, iron, and brass, or an alloy thereof can be used.

With a sealing member 212 placed at the opening of the bottomed case 211 in which the wound body 100 is housed, the open end of the bottomed case 211 is curled and crimped onto the sealing member 212, and then, a seat plate 213 is disposed on the curled portion. Thus, the wound body 100 is sealed within the bottomed case 211.

The sealing member 212 is formed so as to allow the lead wires 60A and 60B to pass therethrough. The sealing member 212 is an electrically insulating substance, and is preferably an elastic body. Particularly preferred are those having high heat resistance, such as silicone rubber, fluorocarbon rubber, ethylene propylene rubber, Hypalon rubber, butyl rubber, and isoprene rubber.

Although the above embodiment describes a wound electrolytic capacitor, the scope of application of the present invention is not limited thereto, and is applicable to other electrolytic capacitors, such as a laminated electrolytic capacitor. The laminated electrolytic capacitor includes, for example, a laminated capacitor element and a package body sealing the capacitor element. The laminated capacitor element includes an anode body, a solid electrolyte layer, and a cathode layer covering the solid electrolyte layer. The anode body includes the above-described electrode foil (first electrode foil) with a porous portion formed at part of the surface thereof, and a dielectric layer covering a metal framework constituting the porous portion of the above electrode foil. The solid electrolyte layer is formed so as to cover the dielectric layer. The cathode layer has, for example, a silver paste layer and a carbon layer. An anode lead is connected to the anode body at an area not covered with the dielectric layer, and a cathode lead is connected to the cathode layer. Part of the anode lead and part of the cathode lead are exposed from the package body. A plurality of capacitor elements may be laminated, forming a laminated body.

L9-9 in the first to ninth sections (5 μm×5 μm square) of the porous portion were as shown in Table 1, and the pit perimeter length L1 to L3 in the first to third regions were as shown in Table 2. In Tables 1 and 2, A1-1 to A2-1 are the first electrode foils of Examples 1 and 2, and B1-1 is the first electrode foil of Comparative Example 1. The pit perimeter lengths L9-1 to L9-9 in the first to ninth sections and the pit perimeter lengths L1 to L3 in the first to third regions were determined by the already-described method.

TABLE 1

| | pit perimeter length ($\mu m/\mu m^2$) | | | | | | | | |
| | first region R1 | | | second region R2 | | | third region R3 | | |
| first electrode foil | first section (L9-1) | second section (L9-2) | third section (L9-3) | fourth section (L9-4) | fifth section (L9-5) | sixth section (L9-6) | seventh section (L9-7) | eighth section (L9-8) | nineth section (L9-9) |
|---|---|---|---|---|---|---|---|---|---|
| A1-1 | 91.6 | 121.6 | 150.8 | 151.9 | 165.8 | 142.2 | 120.1 | 145.0 | 96.3 |
| A2-1 | 121.6 | 140.6 | 148.8 | 156.0 | 150.4 | 145.3 | 130.1 | 125.6 | 87.8 |
| B1-1 | 78.1 | 79.6 | 76.9 | 74.5 | 77.3 | 78.8 | 75.0 | 71.8 | 66.2 |

TABLE 2

| first electrode foil | pit perimeter length ($\mu m/\mu m^2$) | | | | | | |
| | first region (L1) | second region (L2) | third region (L3) | L2/L1 | L2/L3 | L1/L3 | 2 × L2/(L1 + L3) |
|---|---|---|---|---|---|---|---|
| A1-1 | 121.3 | 153.3 | 120.5 | 1.26 | 1.27 | 1.01 | 1.27 |
| A2-1 | 137.0 | 150.6 | 114.5 | 1.10 | 1.32 | 1.20 | 1.20 |
| B1-1 | 78.2 | 76.9 | 71.0 | 0.98 | 1.08 | 1.10 | 1.03 |

The present disclosure will be more specifically described below with reference to Examples. It is to be noted, however, the present disclosure is not limited to the Examples.

<<Examples 1 and 2 and Comparative Example 1>>

(Production of First Electrode Foil)

An Al foil (thickness 130 μm) was prepared as a metal foil. The Al foil was pretreated with an aqueous hydrochloric acid solution, and then, applied with an AC current in an etching solution containing hydrochloric acid as a major component, to perform an etching process. The etching process included a plurality of steps, and the etching current (current density, frequency) and the temperature of the etching solution were adjusted as appropriate, according to the step performed. In Examples 1 and 2, as the etching process proceeds, the etching current (current density, frequency) was decreased in three steps, and the temperature of the etching solution was decreased in three steps. On the other hand, in Comparative Example 1, the etching process was performed, with the etching current (current density, frequency) and the temperature of the etching solution set constant.

In Examples 1 to 2 and Comparative Example 1, an intermediate treatment step of immersing the Al foil in an aqueous potassium phosphate solution was performed during the etching process (multiple steps). The timing and the frequency of performing the intermediate treatment step were adjusted as appropriate.

In this way, an etched foil (first electrode foil) having a porous portion (thickness 45 μm) on each of both surfaces of the Al foil was obtained. The pit perimeter lengths L9-1 to (Production of Second Electrode Foil)

The first electrode foils A1-1, A2-1, and B1-1 were subjected to chemical conversion treatment, to form a dielectric layer containing $Al_2O_3$. Thus, the second electrode foils A1-2, A2-2, and B1-2 were obtained.

Evaluation (Folding Endurance and Tensile Strength)

With respect to the first electrode foil, the folding endurance and the tensile strength were measured according to test methods of electrode foil for aluminum electrolytic capacitors (EIAJ RC-2364A) of the standards of Electronic Industries Association of Japan. (Capacitance)

With respect to the second electrode foil, the capacitance (frequency 120 Hz) was measured in a 20° C. environment.

(Impregnation of Electrolyte)

The second electrode foil was impregnated with a processing solution containing a conductive polymer, and dried, to form a solid electrolyte layer covering the inner walls of the pits of the porous portion. The above impregnation was performed by immersing the second electrode in the processing solution for 90 seconds under atmospheric pressure. The processing solution used here was an aqueous PEDOT/PSS dispersion (concentration 4.5 mass %). A thickness-wise cross-sectional image of the second electrode foil after the formation of the solid electrolyte layer was obtained with a SEM. Using this image, a region (5 μm by 5 μm square) was arbitrarily selected in the third region R3 of the porous portion, to determine a total length E0 of the pit inner wall (contour of the area occupied by pits) included in the region, and a length E1 of the portion covered with the solid electrolyte layer of the above pit inner wall was determined. The (E1/E0)×100 was calculated as an electrolyte impregnation rate (%).

The evaluation results are shown in Tables 3 and 4. Note that the folding endurance and the tensile strength in Table 3 are expressed as relative values, with the measured value of B1-1 (first electrode foil) of Comparative Example 1 taken as 100. The capacitance in Table 4 is expressed as a relative value, with the measured value of B1-2 (second electrode foil) of Comparative Example 1 taken as 100.

TABLE 3

| first electrode foil | folding endurance (relative value) | tensile strength (relative value) |
|---|---|---|
| A1-1 | 109 | 135 |
| A2-1 | 107 | 124 |
| B1-1 | 100 | 100 |

TABLE 4

| second electrode foil | capacitance (relative value) | electrolyte impregnation rate (%) |
|---|---|---|
| A1-2 | 175 | 93.1 |
| A2-2 | 178 | 92.7 |
| B1-2 | 100 | 78.5 |

Table 3 shows that, in A1-1 and A2-1, the tensile strength and the folding endurance were higher than in B1-1. In A1-1, the tensile strength and the folding endurance were further higher.

Table 4 shows that, in A1-2 and A2-2, the capacitance and the electrolyte impregnation rate were higher than in B1-2.

Industrial Applicability

The electrode foil for an electrolytic capacitor according to the present disclosure is suitably used in an electrolytic capacitor for which high reliability and large capacitance are required.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

Reference Signs List

10: anode foil, 20: cathode foil, 30: separator, 40: winding stop tape, 50A, 50B: lead tab, 60A, 60B: lead wire, 100: wound body, 110: anode body, 111: core portion, 112: porous portion, 120: dielectric layer, 121: first layer, 200: electrolytic capacitor, 211: bottomed case, 212: sealing member, 213: seat plate

The invention claimed is:

1. An electrode foil for an electrolytic capacitor, comprising:
   a porous portion; and a core portion continuous with the porous portion, wherein
   $1.1 \leq L2/L1$, and $1.1 \leq L2/L3$ are satisfied, where
   when the porous portion is equally divided in three in a thickness direction of the porous portion into a first region, a second region, and a third region sequentially from an outer surface side of the porous portion, the L1 represents a pit perimeter length in the first region, the L2 represents a pit perimeter length in the second region, and the L3 represents a pit perimeter length in the third region, and
   a thickness of the porous portion is 10 μm to 160 μm, or $\frac{1}{10}$ or more and $\frac{5}{10}$ or less of a thickness of the electrode foil for an electrolytic capacitor.

2. The electrode foil for an electrolytic capacitor according to claim 1, wherein the L2/L1 is 1.2 or more.

3. The electrode foil for an electrolytic capacitor according to claim 1, wherein the L2/L3 is 1.2 or more.

4. The electrode foil for an electrolytic capacitor according to claim 1, wherein $2 \times L2/(L1+L3)$ is 1.2 or more.

5. The electrode foil for an electrolytic capacitor according to claim 1, wherein the L2 is 145 μm/μm$^2$ or more and 165 μm/μm$^2$ or less.

6. The electrode foil for an electrolytic capacitor according to claim 1, further comprising a dielectric layer covering at least part of a surface of a metal framework constituting the porous portion.

7. An electrolytic capacitor, comprising: the electrode foil for an electrolytic capacitor of claim 6; and a cathode section covering at least part of the dielectric layer.

8. The electrolytic capacitor according to claim 7, wherein the cathode section includes an electrolyte.

9. The electrolytic capacitor according to claim 7, wherein the cathode section includes a solid electrolyte.

* * * * *